UNITED STATES PATENT OFFICE.

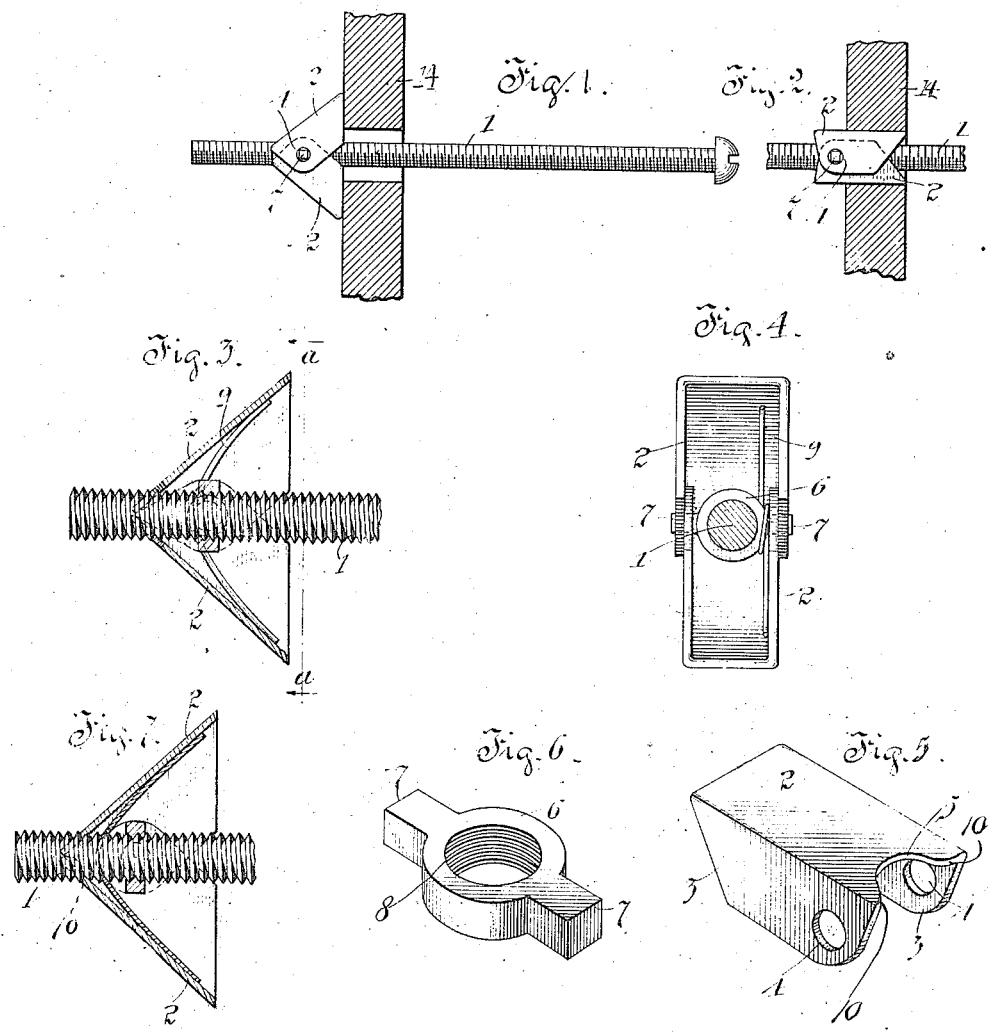

MATHEW H. PAINE, OF GLENELLYN, AND WINFIELD S. WILLIAMS, OF CHICAGO, ILLINOIS.

TOGGLE-BOLT.

1,269,302.   Specification of Letters Patent.   Patented June 11, 1918.

Application filed June 9, 1913. Serial No. 772,590.

*To all whom it may concern:*

Be it known that we, MATHEW H. PAINE, of Glenellyn, Illinois, and WINFIELD S. WILLIAMS, of 932 E. 46th St., Chicago, Illinois, citizens of the United States of America, have invented a certain new and useful Improvement in Toggle-Bolts, of which the following is a specification.

The main objects of our invention are to provide an improved form of toggle-bolt; to provide an improved anchoring device capable of being passed through an aperture and capable of expanding into the position of a truss on the opposite side after the body of the device has passed through the hole; to provide such an expansion device as will prevent the possibility of return of the toggle member through the hole irrespective of the position of the object through which the member is introduced; to provide an improved toggle-bolt where the members are so related that they automatically adapt themselves to the surface of the object after passing through the aperture; to provide such a device as will freely pass into and expand in an internal space practically no greater than the length of one of the trusses, thus accomplishing a universal adaptability; to provide a device which is ready to take hold immediately the same has passed through the aperture; to provide a toggle-bolt whose bearing surfaces are normally adjustably disposed in a position parallel to the inner surface of the object through which it is introduced; to provide an improved expansion device capable of folding for introduction through an aperture and capable of immediate automatic expansion on the reverse side.

An illustrative embodiment of our invention is shown in the accompanying drawings, in which:

Figure 1 is a flat view of a toggle-bolt constructed according to this invention, the different parts shown in their relative position when expanded for attaching. Fig. 2 illustrates the position of the toggle-bolt folded in the hole just prior to its expansion on the opposite side. Fig. 3 is a cross section of the truss members showing the construction and assemblage of same. Fig. 4 is a view taken on line *a—a* of Fig. 3. Fig. 5 is a perspective of one of the truss members. Fig. 6 is a perspective of a nut with trunnions. Fig. 7 is a cross section of a modified form of our device.

In the primary form shown in the drawings, the device comprises a bolt 1 having a threaded shank adapted to engage with the threads 8 of threaded nut 6, said nut having trunnions 7 adapted to form bearings for the pivotal operation of the trusses 2, 2. The holding or expansion member is composed of two trusses 2, 2 as shown in Fig. 5, each of said trusses constructed of one piece of metal having flanges 3, 3 forming a channel. We provide apertures 4, 4 transversely perforating the flange walls of the truss 2, the said holes being adjacent to one end of the said flange walls, the opposite ends of said flange walls being tapered so that the parts will adapt themselves to horizontal alinement when swung into position as shown in Fig. 3. We provide two of these trusses pivotally swung upon the trunnions 7, 7 of the nut 6, but in reverse relation. We provide a neck indenture 5 in the body of the trusses 2, 2 at a point adjacent to the holes 4, 4 in the said truss, said indenture adapted to permit the said trusses freedom of action in relation to the bolt when the said truss member is fully expanded, and to permit the free turning of the screw in the nut after the shoulders of the truss members are in locked form. We provide a coiled spring 9 adapted to be sprung over one of the trunnions 7, immediately inside of the truss members, the said spring having free ends extending in opposite directions inside the channels of the truss members 2, 2 and adapted to equally and automatically expand the said members when free of compression. The coiled spring here shown is a preferable type of tension means. In Fig. 7 we show a form of tension in the way of a flat spring, which may be a thin strip either side of the bolt, or a broad strip with a hole therein, adapted to slip over the bolt like a collar. Other tension means may suggest themselves to one engaged in the art. The wings, nut, and tension means together constitute a toggle head.

We also provide that the neck 5 in the truss 2 may come into contact with the screw threaded element 1, as in Fig. 7 so that when the said truss elements 2—2 are in normal expanded condition the strain of the same is brought to bear upon the screw element 1, thus forming a solid support, while at the same time the screw threaded element can be propelled forward or backward.

We provide that the truss elements shall overlap at the point of pivotal engagement with the trunnions of the nut, the holes 4 on the opposite sides of each registering with the holes on the other, thus pivotally balancing the truss elements, and so formed that one will fold into the other when pressed into parallel alinement. We primarily denominate the anchoring members 2, 2 as trusses; and we preferably form them into a channel—as shown in the drawings—to secure lightness and strength: we also refer to the same as wings, winged members and anchoring wings, for the reason that they operate as such.

When the device is to be used, a hole of suitable size is bored in the body or wall 14, to which the object is to be made fast, by means of this device; the bolt 1 with the expansion member in distended position is then inserted head foremost into the hole 14; a slight pressure upon the bolt 1 operates to force the elements 2, 2 into parallel alinement with the bolt 1, thus permitting the entire device to freely enter and pass through the hole; immediately the bases of the truss elements 2, 2 have passed through the said hole 14 the spring forces the truss elements so the shoulder adjacent to the pivotal points of one come in contact with the inside channel walls of the other, the points nearest their pivotal point forming the apex of a triangle, their bases in horizontal extension each with the other, extending in opposite directions on either side of the bolt, thus presenting a solid truss for holding strain; they are also flexibly disposed so that the contour of the surface against which the truss is drawn does not affect the adjustment of the threaded bolt, when the device is drawn into final position the truss elements clamp the bolt tightly. It will be readily observed that the device herein shown is adapted to walls at any and all angles, that it is immediate and positive in its adjustment to the surface after it has passed through the aperture, that there is practically no necessity for take-up area to the bolt, and that it cannot return through the aperture whatsoever be its position, without external volition.

We show this preferred form of our invention, which illustrates the principle, but we do not limit ourselves to this specific form, except as required by the scope of the claims.

What we claim and desire to secure by Letters Patent is:

1. In an anchoring device, the combination of a screw, a nut movable thereon, trunnions on said nut, two oppositely disposed wings coaxially pivoted upon said trunnions and having surfaces adapted for engagement with a wall, means to project said wings outwardly from said screw until said wall engaging surfaces stand at substantially right angles to the longitudinal axis of said screw.

2. In an anchoring device the combination of a screw; a nut thereon having trunnions; two folding members pivoted coaxially upon the said trunnions—said members adapted to fold longitudinally of said screw and into each other; means to laterally project said pivoted members to a position at substantially right angles to the said screw; means to limit said lateral projection.

3. In an anchoring device, consisting of a screw; a nut adapted to work in threaded engagement thereon; said nut formed with a pair of lugs—one projecting from either side thereof—adapted to serve as an axis; a pair of truss elements pivoted coaxially on said lugs—in reverse relation to each other— adapted to form a truss when projected outwardly from the screw; means to force the said truss elements outwardly from the screw and maintain the same in lateral distension when free.

4. A device for the purposes described consisting of a screw; in threaded engagement therewith a nut having trunnions, adapted to act as an axis; anchoring means pivoted coaxially of each other to said nut and movable laterally from the bolt and outwardly with respect to the same into anchoring position; a spring serving to force the anchoring means laterally from each other and from the screw—on said axis—into an anchoring position.

5. In a device of the character described the combination of a bolt; a nut threaded thereon and movable relatively longitudinally of the bolt; anchoring means pivoted coaxially of each other on said nut and movable laterally from the bolt and outwardly with respect to the same toward the outer end of the bolt into anchoring position.

6. In an anchoring device the combination of a threaded rod; a nut operating in threaded engagement therewith; lugs upon said nut; a pair of anchoring members coaxially pivoted upon said lugs; a spring operating upon the said anchoring members to force them into anchoring position; there being means to limit the lateral and rearward travel of the anchoring members and effect the formation of a truss.

7. In an anchoring device the combination of a screw; a nut movable upon said screw; lugs upon said nut; two truss members— reversely disposed—having pivotal points coincident; coaxially disposed upon said lugs; a coiled spring mounted upon one of said lugs—the free ends of said spring operating upon the truss members to force said truss members into and sustain them in opposed lateral truss engagement with the bolt.

8. In an anchoring device the combination of a threaded bolt; a nut relatively movable along the same; said nut having oppositely disposed lugs extending laterally from the bolt; a pair of anchor wings—each having a pair of parallel side portions—pivoted upon said lugs around the same pivotal axis; and means adapted to cause the wings to be swung laterally with respect to each other around their axis into anchoring position.

9. In a device for the purpose described the combination of a threaded bolt; a nut mounted upon the threaded bolt; a pair of anchor wings pivoted upon the nut; a spring acting between the wings tending to force them apart and around their axis.

10. In an anchoring device the combination of a screw; a nut thereon; two truss members coaxially pivoted upon said nut; a spring operating upon said truss members; said screw adapted to act as the center and abutment of the said truss members, the said truss members adapted to coöperate with the said screw to form an anchoring truss.

11. In a device of the character described the combination with a threaded bolt, of a unitary mechanism adapted to be freely propelled over the longitudinal area of the bolt, consisting of a pair of anchor wings pivotally associated with said bolt, said wings having their inner extremities impinging against the sides of said bolt when the said wings are swung outwardly into final anchoring position, and automatic means tending to swing said wings outwardly into anchoring position.

12. In a device of the character described the combination with a threaded bolt, of a unitary mechanism adapted to be freely propelled over the longitudinal area of the bolt, consisting of a pair of anchor wings pivotally associated with said bolt, said anchoring members having their inner extremities engaging the screw thread of said bolt when the said anchoring members are swung outwardly into final anchoring position, and automatic means tending to swing said anchoring members outwardly into anchoring position.

13. In an anchoring device the combination with a threaded bolt, of a unitary mechanism adapted to be freely propelled over the longitudinal area of the bolt, consisting of two truss members pivotally associated with said bolt, spring means tending to force said truss members into their anchoring position, said bolt adapted to act as the center and abutment of the said truss members and coöperating therewith to form an anchoring truss when said truss members are swung outwardly into anchoring position, said truss members clamping the bolt between them.

14. In an anchoring device the combination with a threaded bolt, of a unitary mechanism adapted to be freely propelled over the longitudinal area of the bolt, consisting of two truss members pivotally associated with said bolt, automatic means tending to force said truss members into their anchoring position, said bolt adapted to act as the center and abutment of the said truss members and coöperating therewith to form an anchoring truss when said truss members are swung outwardly into anchoring position, said truss members clamping the bolt between them.

15. In a device of the character described the combination with a screw threaded bolt, a nut movable thereon, a pair of oppositely disposed anchoring wings swingingly associated with said nut, said nut and said wings adapted to freely travel as a unit the longitudinal area of the bolt, and automatic means tending to project said wings outwardly into anchoring position.

16. In a device of the character described the combination with a screw threaded bolt, a nut movable thereon, a pair of oppositely disposed anchoring wings swingingly associated with said nut, and automatic means tending to project said wings outwardly into anchoring position, said wings having inner extremities impinging against the screw thread of said bolt when said wings are swung outwardly.

17. In a device of the character described the combination with a screw threaded bolt, a nut movable thereon, a pair of oppositely disposed anchoring wings swingingly associated with said nut, said nut and said wings adapted to freely travel as a unit the longitudinal area of the bolt, and spring means tending to project said wings outwardly into anchoring position.

18. In a device of the character described the combination with a screw threaded bolt, a nut movable thereon, a pair of oppositely disposed anchoring wings swingingly associated with said nut, and spring means tending to project said wings outwardly into anchoring position, said wings having inner extremities impinging against the screw thread of said bolt when said wings are swung outwardly.

19. In a device of the character described the combination with a threaded bolt, of a pair of anchoring members swingingly associated with said bolt and adapted when said members are swung outwardly into anchoring positon to clamp the bolt between them, and means for automatically swinging said anchoring members outwardly into anchoring position; said anchoring members being adapted to freely travel the longitudinal area of the bolt, and coöperate with said bolt to form a clamp.

20. In a device of the character described the combination with a threaded bolt, of a pair of anchoring members pivotally associated with said bolt, the inner extremities of said anchoring members coöperating to form a truss out of said anchoring members, and means for automatically swinging said anchoring members outwardly into anchoring position; said anchoring members being adapted to freely travel the longitudinal area of the bolt, and coöperate with said bolt to form a clamp.

21. A toggle bolt comprising, in combination, a screw threaded member, a collar threaded upon the member, wings pivotally secured to the collar and having wall engaging surfaces, and tension means for normally causing the wings to spread, the wings being arranged to engage with the sides of the screw threaded member to limit their spreading movement to a point where their wall engaging surfaces substantially aline with each other, substantially as described.

22. A toggle bolt comprising, in combination, a screw threaded member, a collar threaded upon the screw threaded member, a pair of wings pivotally secured to the collar, the wings being U-shaped in cross section and arranged to fold upon the screw-threaded member with the side walls of the wings overlapping the screw-threaded member, and tension means for normally causing the wings to assume a position transverse to that of the screw-threaded member, substantially as described.

23. A toggle bolt comprising, in combination, a screw-threaded member, a collar threaded upon the member, wings pivotally secured to the collar, and means for normally causing the wings to lie transversely of the collar, the wings being arranged to engage with the sides of the screw-threaded member to limit their pivotal movement to a point transversely of the member, substantially as described.

24. A toggle bolt comprising, in combination, a screw-threaded member, coaxially pivoted wings carried by the member, the wings being U-shaped in cross section and arranged to fold upon the member with the side walls of the wings overlapping the member, and continuously acting means for normally causing the wings to lie transversely of the member, substantially as described.

25. A toggle bolt comprising, in combination, a screw-threaded member, coaxially pivoted wings carried by the member, the wings being U-shaped in cross-section and arranged to fold upon the member with the side walls of the wings overlapping the member, and a spring in engagement with the wings for normally causing the wings to assume a position transverse to that of the member, substantially as described.

Signed by us at Chicago, Illinois, this 26th day of May, 1913.

MATHEW H. PAINE.
WINFIELD S. WILLIAMS.

Witnesses:
GILES M. TURNER,
CLARA M. FISCHER.